United States Patent
Singh et al.

(10) Patent No.: US 8,909,219 B2
(45) Date of Patent: Dec. 9, 2014

(54) METHODS AND APPARATUS FOR PROVIDING UNIFIED WIRELESS COMMUNICATION THROUGH EFFICIENT MEMORY MANAGEMENT

(71) Applicant: QUALCOMM Incorporated, San Diego, CA (US)

(72) Inventors: Balvinder Singh, Hyderabad (IN); Royston Rodrigues, Pune (IN); Bhasker Neti, Hyderabad (IN); Ram Mohan Korukonda, Hyderabad (IN); Pradeep Panigrahi, Hyderabad (IN); Nitin Shivpure, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 127 days.

(21) Appl. No.: 13/744,144

(22) Filed: Jan. 17, 2013

(65) Prior Publication Data
US 2014/0199995 A1   Jul. 17, 2014

(51) Int. Cl.
| H04W 4/00 | (2009.01) |
| G06F 13/16 | (2006.01) |
| G06F 15/167 | (2006.01) |
| H04W 88/02 | (2009.01) |
| H04W 88/06 | (2009.01) |

(52) U.S. Cl.
CPC ........... *H04W 88/06* (2013.01); *G06F 13/1663* (2013.01); *G06F 15/167* (2013.01); *H04W 88/02* (2013.01)
USPC ........................................................ 455/426.1

(58) Field of Classification Search
USPC ........................................................ 455/426.1
See application file for complete search history.

(56) References Cited

U.S. PATENT DOCUMENTS

| 5,911,149 A | 6/1999 | Luan et al. |
| 5,929,868 A * | 7/1999 | Howard et al. ............... 345/545 |
| 6,987,961 B1 | 1/2006 | Pothana |
| 8,006,221 B2 | 8/2011 | Arora et al. |
| 8,122,199 B2 | 2/2012 | Kwon et al. |
| 2007/0288701 A1 | 12/2007 | Hofstee et al. |
| 2009/0019237 A1 | 1/2009 | Kwon et al. |
| 2010/0265861 A1 * | 10/2010 | He et al. ...................... 370/311 |

OTHER PUBLICATIONS

Partial International Search Report—PCT/US2014/011179—International Search Authority European Patent Office May 22, 2014. (7 pages).

(Continued)

*Primary Examiner* — Joel Ajayi
(74) *Attorney, Agent, or Firm* — Arent Fox LLP

(57) ABSTRACT

A method, an apparatus, and a computer program product for wireless communication are provided in connection with improving interactions between various components within a wireless device to enable improved communications between wireless devices. In an example, a wireless device may include an application processor equipped to send first and second amounts of data to be buffered in a buffer associated with a controller, and cease communications with the controller after the second amount of data is sent. In an aspect, the ceasing of communications may include switching to a sleep mode. In an aspect, the amounts of data are larger than a threshold data size, and the buffer includes logically combined dedicated memories from SOCs for a plurality of access technologies controlled by the controller.

32 Claims, 10 Drawing Sheets

(56) References Cited

OTHER PUBLICATIONS

Ramacher U., "Software-Defined Radio Prospects for Multistandard Mobile Phones", Computer, IEEE, US, vol. 40, No. 10, Oct. 1, 2007, pp. 62-69, XP011193858, ISSN: 0018-9162, DOI: 10.1109/MC. 2007.362 section Music-1: a prototype SDR baseband solution; p. 65-p. 67; figure 3.

Bluetooth, "Specification of the Bluetooth System, Wireless Conections Made Easy", Covered Core Package version: 3.0 + HS, Apr. 21, 2009, 1712 pgs.

* cited by examiner

METHODS AND APPARATUS FOR PROVIDING UNIFIED WIRELESS COMMUNICATION THROUGH EFFICIENT MEMORY MANAGEMENT

BACKGROUND

1. Field

The present disclosure relates generally to communication systems, and more particularly, to improving wireless communications through unified wireless communication using efficient memory management.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks.

As the demand for mobile broadband access continues to increase, research and development continue to advance the UMTS technologies not only to meet the growing demand for mobile broadband access, but to advance and enhance the user experience with mobile communications.

Currently, a wireless device that supports multiple radio access technologies (RATs) may include a separate system on chip (SOC) for each of the supported RATs. For example, separate SOCs may support each of Bluetooth, FM Radio, WiFi, ANT, Zigbee, NFC, etc. Further, the SOCs may be associated with a controller and each SOC may include separate memory (e.g., RAM and ROM), its own processor, and its own low power and RF control mechanism. As each SOC's dedicated memory may be relatively small, the amount of data that may be buffered in the memory may be relatively small, and the controller may interact repeatedly with an application processor to obtain more data. Such repeated interactions increase the time that the application processor is active and may increase power consumption by the application processor accordingly.

Therefore, methods and apparatuses enabling improved interactions between various components within a wireless device (e.g., to reduce the host to controller interactions as much as possible) and improved communications between wireless devices may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with improving interactions between various components within a wireless device to enable efficient communications between wireless devices. In an example, a wireless device may include an application processor equipped to send a first and second amounts of data to be buffered in a buffer associated with a controller, and cease communications with the controller after the second amount of data is sent. In an aspect, the ceasing of communications may include switching to a sleep mode. In an aspect, the amounts of data are larger than a threshold data size, and the buffer includes logically combined dedicated memories from SOCs for a plurality of access technologies controlled by the controller.

According to a related aspect, a method for improving interactions between various components within a wireless device to enable improved communications between wireless devices is provided. The method can include sending, by an application processor, a first amount of data to be buffered in a buffer associated with a controller. In an aspect, the first amount of data may be larger than a threshold data size. In another aspect, the buffer may include logically combined dedicated memories from SOCs for a plurality of access technologies controlled by the controller. Further, the method can include sending a second amount of data to be buffered in the buffer associated with the controller. Moreover, the method may include ceasing communications with the controller after the second amount of data is sent. In an aspect, the ceasing communications may include switching to a sleep mode.

Another aspect relates to a communications apparatus for improving interactions between various components within a wireless device to enable improved communications between wireless devices. The communications apparatus can include means for sending, by an application processor, a first amount of data to be buffered in a buffer associated with a controller. In an aspect, the first amount of data may be larger than a threshold data size. In another aspect, the buffer may include logically combined dedicated memories from SOCs for a plurality of access technologies controlled by the controller. Further, the communications apparatus means for sending can be configured to send a second amount of data to be buffered in the buffer associated with the controller. Moreover, the communications apparatus can include means for ceasing communications with the controller after the second amount of data is sent. In an aspect, the means for ceasing communications may be configured to switch the application processor to a sleep mode.

Another aspect relates to a communications apparatus. The apparatus can include a processing system configured to send, by an application processor, a first amount of data to be buffered in a buffer associated with a controller. In an aspect, the first amount of data may be larger than a threshold data size. In another aspect, the buffer may include logically combined dedicated memories from SOCs for a plurality of access technologies controlled by the controller. Further, the processing system may be configured to send a second amount of data to be buffered in the buffer associated with the controller. Moreover, the processing system may further be configured to cease communications with the controller after the second amount of data is sent. In an aspect, the ceasing of communications may include switching to a sleep mode.

Still another aspect relates to a computer program product, which can have a computer-readable medium including code for sending, by an application processor, a first amount of data to be buffered in a buffer associated with a controller. In an aspect, the first amount of data may be larger than a threshold data size. In another aspect, the buffer may include logically combined dedicated memories from SOCs for a plurality of access technologies controlled by the controller. Further, the computer-readable medium can include code for sending a second amount of data to be buffered in the buffer associated with the controller. Moreover, the computer-readable medium can include code for ceasing communications with the controller after the second amount of data is sent. In an aspect, the code for ceasing communications may include code for switching to a sleep mode.

According to another related aspect, a method for improving interactions between various components within a wireless device to enable improved communications between wireless devices is provided. The method can include receiving a first amount of data into a buffer associated with a controller, wherein the buffer includes logically combined dedicated memories from SOCs for a plurality of access technologies controlled by the controller. Further, the method can include receiving a second amount of data into the buffer. Moreover, the method may include transmitting at least a portion of the first amount of data using at least one of the plurality of access technologies.

Another aspect relates to a communications apparatus for improving interactions between various components within a wireless device to enable improved communications between wireless devices. The communications apparatus can include means for receiving a first amount of data into a buffer associated with a controller, wherein the buffer includes logically combined dedicated memories from SOCs for a plurality of access technologies controlled by the controller. Further, the communications apparatus means for receiving may be configured to receive a second amount of data into the buffer. Moreover, the communications apparatus can include means for transmitting at least a portion of the first amount of data using at least one of the plurality of access technologies.

Another aspect relates to a communications apparatus. The apparatus can include a processing system configured to receive a first amount of data into a buffer associated with a controller, wherein the buffer includes logically combined dedicated memories from SOCs for a plurality of access technologies controlled by the controller. Further, the processing system may be configured to receive a second amount of data into the buffer. Moreover, the processing system may further be configured to transmit at least a portion of the first amount of data using at least one of the plurality of access technologies.

Still another aspect relates to a computer program product, which can have a computer-readable medium including code for receiving a first amount of data into a buffer associated with a controller, wherein the buffer includes logically combined dedicated memories from SOCs for a plurality of access technologies controlled by the controller. Further, the computer-readable medium can include code for receiving a second amount of data into the buffer. Moreover, the computer-readable medium can include code for transmitting at least a portion of the first amount of data using at least one of the plurality of access technologies.

According to still another related aspect, a method for improving interactions between various components within a wireless device to enable improved communications between wireless devices is provided. The method can include receiving, by a controller, a first amount of data from a remote wireless device. Further, the method can include storing the first amount of data in a buffer. In an aspect, the buffer may include logically combined dedicated memories from SOCs for a plurality of access technologies controlled by the controller. Further, the method can include determining that the first amount of data is successfully received. Moreover, the method may include sending the first amount of data to an application processor based on the determination.

Another aspect relates to a communications apparatus for improving interactions between various components within a wireless device to enable improved communications between wireless devices. The communications apparatus can include means for receiving, by a controller, a first amount of data from a remote wireless device. Further, the communications apparatus can include means for storing the first amount of data in a buffer. In an aspect, the buffer may include logically combined dedicated memories from SOCs for a plurality of access technologies controlled by the controller. Further, the communications apparatus can include means for determining that the first amount of data is successfully received. Moreover, the communications apparatus can include means for sending the first amount of data to an application processor based on the determination.

Another aspect relates to a communications apparatus. The apparatus can include a processing system configured to receive, by a controller, a first amount of data from a remote wireless device. Further, the processing system may be configured to store the first amount of data in a buffer. In an aspect, the buffer may include logically combined dedicated memories from SOCs for a plurality of access technologies controlled by the controller. Further, the processing system may be configured to determine that the first amount of data is successfully received. Moreover, the processing system may further be configured to send the first amount of data to an application processor based on the determination.

Still another aspect relates to a computer program product, which can have a computer-readable medium including code for receiving, by a controller, a first amount of data from a remote wireless device. Further, the computer-readable medium can include code for storing the first amount of data in a buffer. In an aspect, the buffer may include logically combined dedicated memories from SOCs for a plurality of access technologies controlled by the controller. Further, the computer-readable medium can include code for determining that the first amount of data is successfully received. Moreover, the computer-readable medium can include code for sending the first amount of data to an application processor based on the determination.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
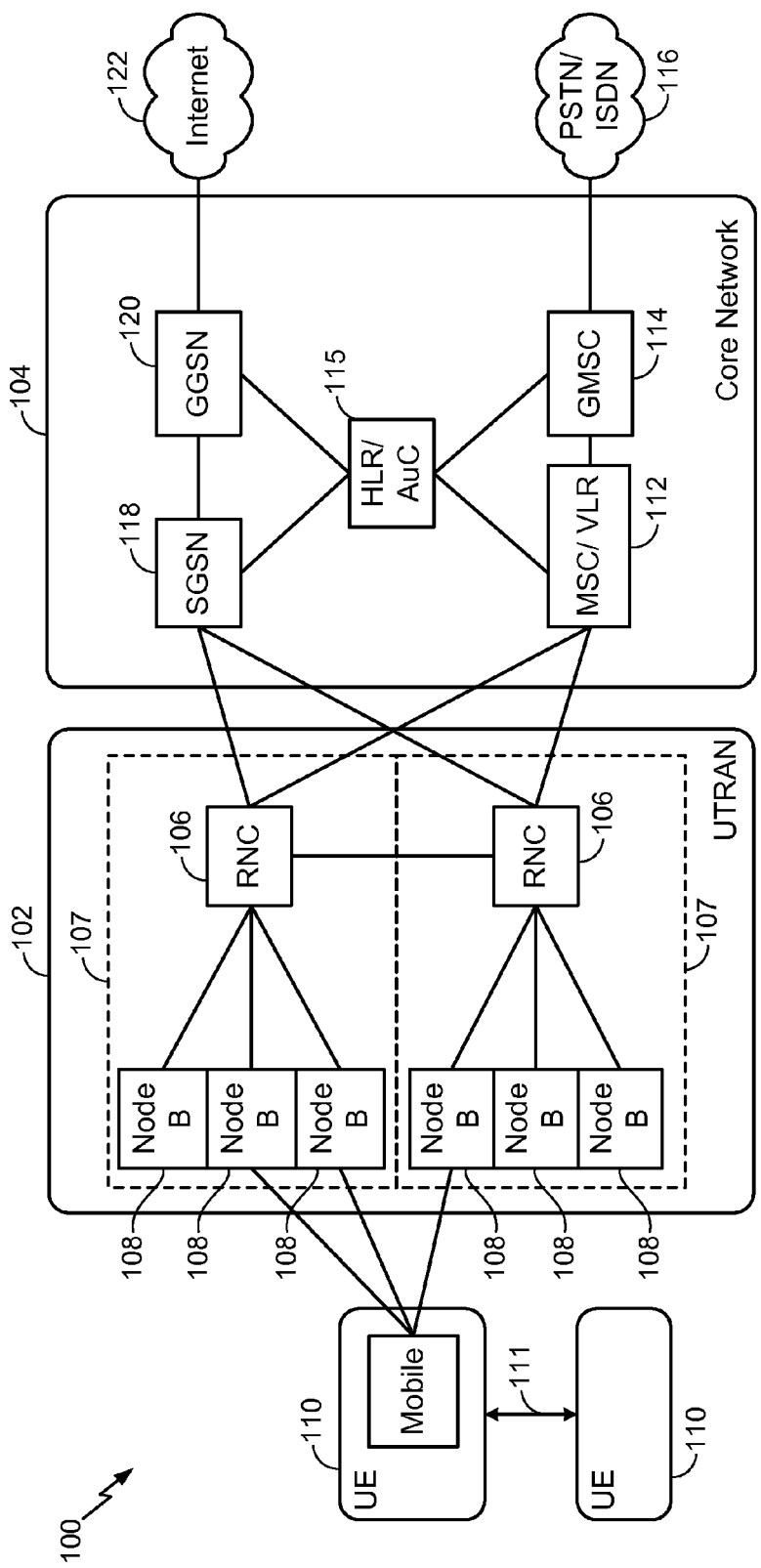
FIG. 1 is a diagram illustrating an example of an access network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

By way of example and without limitation, the aspects of the present disclosure illustrated in FIG. 1 are presented with reference to a UMTS system 100 employing a W-CDMA air interface and/or CDMA2000 air interface. A UMTS network includes three interacting domains: a Core Network (CN) 104, a UMTS Terrestrial Radio Access Network (UTRAN) 102, and one or more User Equipments (UEs) 110. In an example, the UTRAN 102 provides various wireless services including telephony, video, data, messaging, broadcasts, and/or other services. The UTRAN 102 may include a plurality of Radio Network Subsystems (RNSs) such as an RNS 107, each controlled by a respective Radio Network Controller (RNC) such as an RNC 106. Here, the UTRAN 102 may include any number of RNCs 106 and RNSs 107 in addition to the RNCs 106 and RNSs 107 illustrated herein. The RNC 106 is an apparatus responsible for, among other things, assigning, reconfiguring, and releasing radio resources within the RNS 107. The RNC 106 may be interconnected to other RNCs (not shown) in the UTRAN 102 through various types of interfaces such as a direct physical connection, a virtual network, or the like, using any suitable transport network.

In another example, UEs 110 may communicate directly with each other through a peer-to-peer communications 111. In an aspect, communications between a UE and a Node 108 and/or peer-to-peer communications 111 may be based on a wireless communications access technology, such as but not limited to, a Bluetooth based access technology, a frequency modulation (FM) Radio based access technology, a WiFi based access technology, an ANT based access technology, a Zigbee based access technology, a near field communication (NFC) based access technology, etc.

Communication between a UE 110 and a Node B 108 may be considered as including a physical (PHY) layer and a medium access control (MAC) layer. Further, communication between a UE 110 and an RNC 106 by way of a respective Node B 108 may be considered as including a radio resource control (RRC) layer. In the instant specification, the PHY layer may be considered layer 1; the MAC layer may be considered layer 2; and the RRC layer may be considered layer 3. Information hereinbelow utilizes terminology introduced in the RRC Protocol Specification, 3GPP TS 25.331 v9.1.0, incorporated herein by reference.

The geographic region covered by the RNS 107 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 108 are shown in each RNS 107; however, the RNSs 107 may include any number of wireless Node Bs. The Node Bs 108 provide wireless access points to a CN 104 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as a UE in UMTS applications, but may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. For illustrative purposes, one UE 110 is shown in communication with a number of the Node Bs 108. The DL, also called the forward link, refers to the communication link from a Node B 108 to a UE 110, and the UL, also called the reverse link, refers to the communication link from a UE 110 to a Node B 108.

The CN 104 interfaces with one or more access networks, such as the UTRAN 102. As shown, the CN 104 is a GSM core network. However, as those skilled in the art will recognize, the various concepts presented throughout this disclosure may be implemented in a RAN, or other suitable access network, to provide UEs with access to types of CNs other than GSM networks.

The CN 104 includes a circuit-switched (CS) domain and a packet-switched (PS) domain. Some of the circuit-switched elements are a Mobile services Switching Centre (MSC) 112, a Visitor location register (VLR), and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the CN 104 supports circuit-switched services with a MSC 112 and a GMSC 114. In some applications, the GMSC 114 may be referred to as a media gateway (MGW). One or more RNCs, such as the RNC 106, may be connected to the MSC 112. The MSC 112 is an apparatus that controls call setup, call routing, and UE mobility functions. The MSC 112 may also include a VLR that contains subscriber-related information for the duration that a UE is in the coverage area of the MSC 112. The GMSC 114 provides a gateway through the MSC 112 for the UE to access a circuit-switched network 116. The GMSC 114 includes a home location register (HLR) 115 containing subscriber data, such as the data reflecting the details of the services to which a particular user has subscribed. The HLR is also associated with an authentication center (AuC) that contains subscriber-specific authentication data. When a call is received for a particular UE, the GMSC 114 queries the HLR 115 to determine the UE's location and forwards the call to the particular MSC serving that location.

The CN 104 also supports packet-data services with a serving General Packet Radio Service (GPRS) support node (SGSN) 118 and a gateway GPRS support node (GGSN) 120. GPRS is designed to provide packet-data services at speeds higher than those available with standard circuit-switched data services. The GGSN 120 provides a connection for the UTRAN 102 to a packet-based network 122. The packet-based network 122 may be the Internet, a private data network, or some other suitable packet-based network. The primary function of the GGSN 120 is to provide the UEs 110 with packet-based network connectivity. Data packets may be transferred between the GGSN 120 and the UEs 110 through the SGSN 118, which performs primarily the same functions in the packet-based domain as the MSC 112 performs in the circuit-switched domain.

An air interface for UMTS may utilize a spread spectrum Direct-Sequence Code Division Multiple Access (DS-CDMA) system. The spread spectrum DS-CDMA spreads user data through multiplication by a sequence of pseudorandom bits called chips. The "wideband" W-CDMA air interface for UMTS is based on such direct sequence spread spectrum technology and additionally calls for a frequency division duplexing (FDD). FDD uses a different carrier frequency for the UL and DL between a Node B 108 and a UE 110. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles may be equally applicable to a TD-SCDMA air interface.

Figure 2:
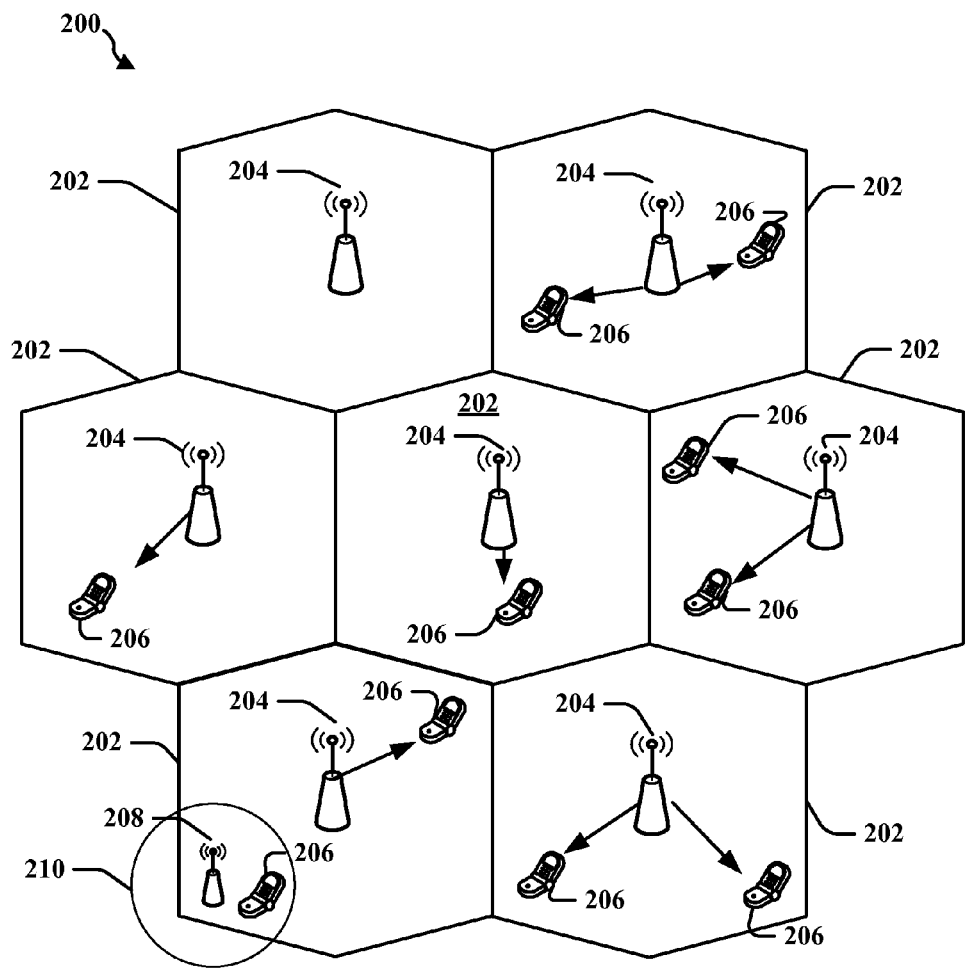
FIG. 2 is a diagram illustrating an example of another access network architecture.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
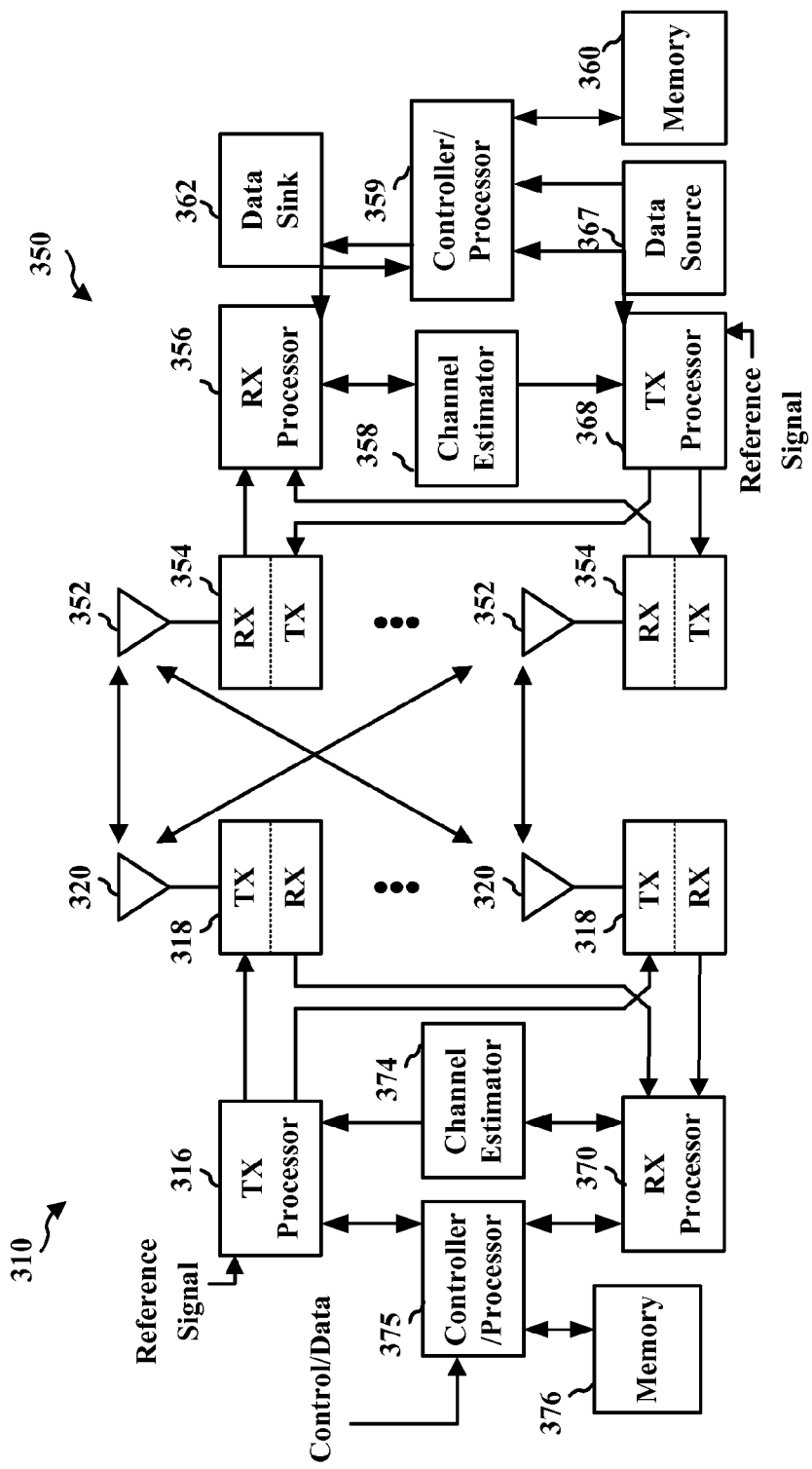
FIG. 3 is a diagram illustrating an example of a network entity and user equipment in an access network.

FIG. 3 is a block diagram of a network entity 310 (e.g., eNB, pico node, a femto node, an MSC, etc.) in communication with a UE 350 in an access network. In the DL, upper layer packets from the core network are provided to a controller/processor 375. The controller/processor 375 implements the functionality of the L2 layer. In the DL, the controller/processor 375 provides header compression, ciphering, packet segmentation and reordering, multiplexing between logical and transport channels, and radio resource allocations to the UE 350 based on various priority metrics. The controller/processor 375 is also responsible for HARQ operations, retransmission of lost packets, and signaling to the UE 350.

The transmit (TX) processor 316 implements various signal processing functions for the L1 layer (i.e., physical layer). The signal processing functions includes coding and interleaving to facilitate forward error correction (FEC) at the UE 350 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream is then provided to a different antenna 320 via a separate transmitter 318TX. Each transmitter 318TX modulates an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The RX processor 356 implements various signal processing functions of the L1 layer. The RX processor 356 performs spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the network entity 310. These soft decisions may be based on channel estimates computed by the channel estimator 358. The soft decisions are then decoded and deinterleaved to recover the data and control signals that were originally transmitted by the network entity 310 on the physical channel. The data and control signals are then provided to the controller/processor 359.

The controller/processor 359 implements the L2 layer. The controller/processor can be associated with a memory 360 that stores program codes and data. The memory 360 may be referred to as a computer-readable medium. In the UL, the controller/processor 359 provides demultiplexing between transport and logical channels, packet reassembly, deciphering, header decompression, control signal processing to recover upper layer packets from the core network. The upper layer packets are then provided to a data sink 362, which represents all the protocol layers above the L2 layer. Various control signals may also be provided to the data sink 362 for L3 processing. The controller/processor 359 is also responsible for error detection using an acknowledgement (ACK) and/or negative acknowledgement (NACK) protocol to support HARQ operations.

In the UL, a data source 367 is used to provide upper layer packets to the controller/processor 359. The data source 367 represents all protocol layers above the L2 layer. Similar to the functionality described in connection with the DL transmission by the network entity 310, the controller/processor 359 implements the L2 layer for the user plane and the control plane by providing header compression, ciphering, packet segmentation and reordering, and multiplexing between logical and transport channels based on radio resource allocations by the network entity 310. The controller/processor 359 is also responsible for HARQ operations, retransmission of lost packets, and signaling to the network entity 310.

Channel estimates derived by a channel estimator 358 from a reference signal or feedback transmitted by the network entity 310 may be used by the TX processor 368 to select the appropriate coding and modulation schemes, and to facilitate spatial processing. The spatial streams generated by the TX processor 368 are provided to different antenna 352 via separate transmitters 354TX. Each transmitter 354TX modulates an RF carrier with a respective spatial stream for transmission.

The UL transmission is processed at the network entity 310 in a manner similar to that described in connection with the receiver function at the UE 350. Each receiver 318RX receives a signal through its respective antenna 320. Each receiver 318RX recovers information modulated onto an RF carrier and provides the information to a RX processor 370. The RX processor 370 may implement the L1 layer.

The controller/processor 375 implements the L2 layer. The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover upper layer packets from the UE 350. Upper layer packets from the controller/processor 375 may be provided to the core network. The controller/processor 375 is also responsible for error detection using an ACK and/or NACK protocol to support HARQ operations.

Figure 4:
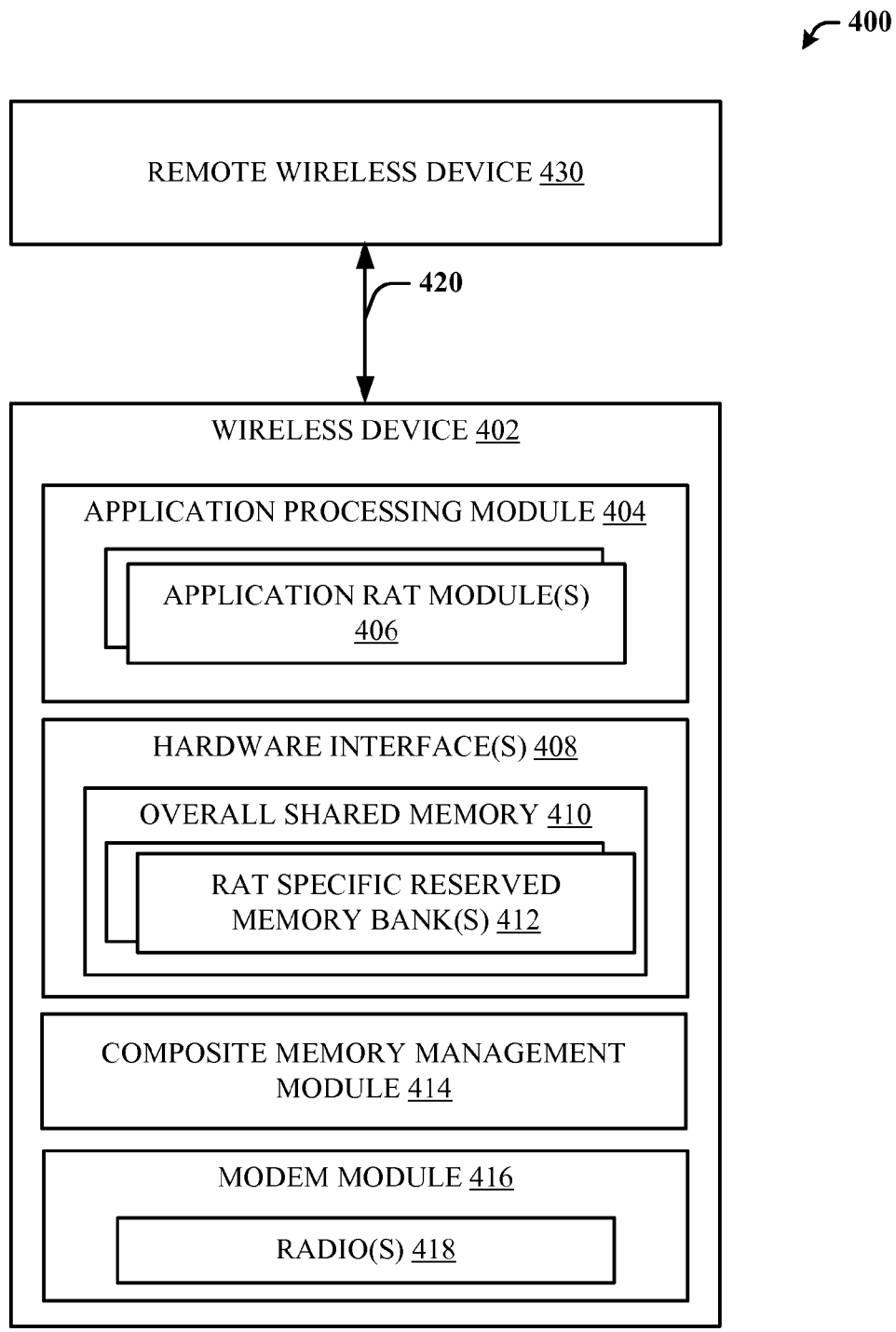
FIG. 4 is a diagram illustrating an example of another access network architecture, according to an aspect.

FIG. 4 depicts an example communication network 400 in which efficient memory usage enables improved wireless communications, according to an aspect.

Communication network 400 may include a wireless device 402 (e.g., UE, wireless communications device (WCD), etc.), and a remote wireless device 430 (e.g., remote UE, a femto node, a pico node, a NodeB, an eNodeB, etc.).

Wireless device 402 may include an application processing module 404, hardware interface module 408, composite memory management module 414, and modem module 416. In an aspect, application processing module 404 may include one or more application that may be configured to communicate with using one or more application radio access technology (RAT) modules 406. In an aspect, each application RAT module 406 may be associated with one or more applications. For example, application RAT module 406 may enable applications to use RATs, such as but not limited to, Bluetooth, WiFi, FM, NFC, Bluetooth low energy (BLE), ANT, etc.

In an aspect, application processing module 404 may be middleware which serves as an intermediary between lower layer stack services or protocols and applications. Application processing module 404 may also be responsible for managing protocol state machines based on the upper layer and lower layer states. Application processing module 404 may also act as an abstraction to the user for any operation. For example, application processing module 404 may process an operation that may have final results that including context to may be processed through multiple states and/or multiple SOC operations. As such, the application layer may remain agnostic to these internal states and is managed only by the middleware. Further, application processing module 404 may be configured to manage multiple stacks and protocol layers, each of which may be specific to its own access technology with no single specification available for all access technologies.

In another aspect, hardware interface 408 may include different SOCs to facilitate communication using different RATs. Hardware interface 408 may include an overall shared memory 410 and RAT specific reserved memory banks 412 associated with each of the SOCs. For example, different RATs may be supported through different/separate SOCs with different RAT specific reserved memory banks 412. In an aspect, each SOC may include firmware that is closely tied up with individual internet protocols (IPs) associated with each access technology. Each Soc may have its own core, ROM Codes, and patches to allow the wireless device 402 to properly function. Each of the IPs/Core may have its own set of local RAMs to allow the device to run the associated access technology code. In other words, for each SOC associated with hardware interface 408 may include its own RAT specific reserved memory banks 412, its own processor, and its own low power and RF control mechanism.

Composite memory management module 414 may be configured to logically combine dedicated memories from RAT specific reserved memory banks 412 associated with each of the SOCs. In an aspect, Composite memory management module 414 may include a logically combined portion of memory and a reserved portion of memory. The reserved portion of the memory may be used to allow the wireless device 402 to switch between an operating state that uses the logically combined memories and a normal operating state. In an aspect, composite memory management module 414 may switch between operating states based on reception of a command, the size of data to be communicated (e.g., greater than 500 MB), etc. The combined memory portion may be used to buffer data from application processing module 404. For example, composite memory management module 414 may store/buffer data across multiple RAT specific reserved memory banks 412 even though the data is configured to communicate using a single RAT. In an aspect, composite memory management module 414 may also be configured to store data received from a remote wireless device 430. In such an aspect, composite memory management module 414 may buffer the received data across the multiple RAT specific reserved memory banks 412 prior to communicating with (e.g., waking up) the application processing module 404. Further description of operational aspects of composite memory management module 414 is provided with reference to FIGS. 5, 6, 7, and 8.

In another aspect, modem module 416 may be configured to use multiple radios 418. Modem module 416 may be configured to use different radios 418 to establish a one or more connections 420 with a remote wireless device 430.

In an operational aspect, composite memory management module 414 may be configured to send and/or receive data using multiple radios 418. In such an aspect, composite memory management module 414 may use a first RAT associated with a first radio 418 to communicate a portion of the data and may use a second RAT associated with a second radio 418 to communicate a second portion of data. For example, modem module 416 may use a Bluetooth link for audio streaming of data and use one or more other radios 418 (e.g., WiFi, FM Radio, BLE, etc) to communicate low priority files at potentially lower speeds. In another operational aspect, use of composite memory management module 414 may allow the application processing module 404 associated with wireless device 402 to operate in a sleep mode and/or be otherwise available for a comparatively longer duration. Further, although modem module 416 may be configured to support composite memory management module 414 based communications using multiple radios 418, composite memory management module 414 and modem module 416 may also be configured to support efficient communications using a single radio 418. Generally, by reducing multiple interactions between the application processing module 404 and composite memory management module 414, the overall system speed may be increased and power savings for the application processing module 404 may be achieved.

FIGS. 5, 6, 7, and 8 illustrate various methodologies in accordance with various aspects of the presented subject matter. While, for purposes of simplicity of explanation, the methodologies are shown and described as a series of acts or sequence steps, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 5:
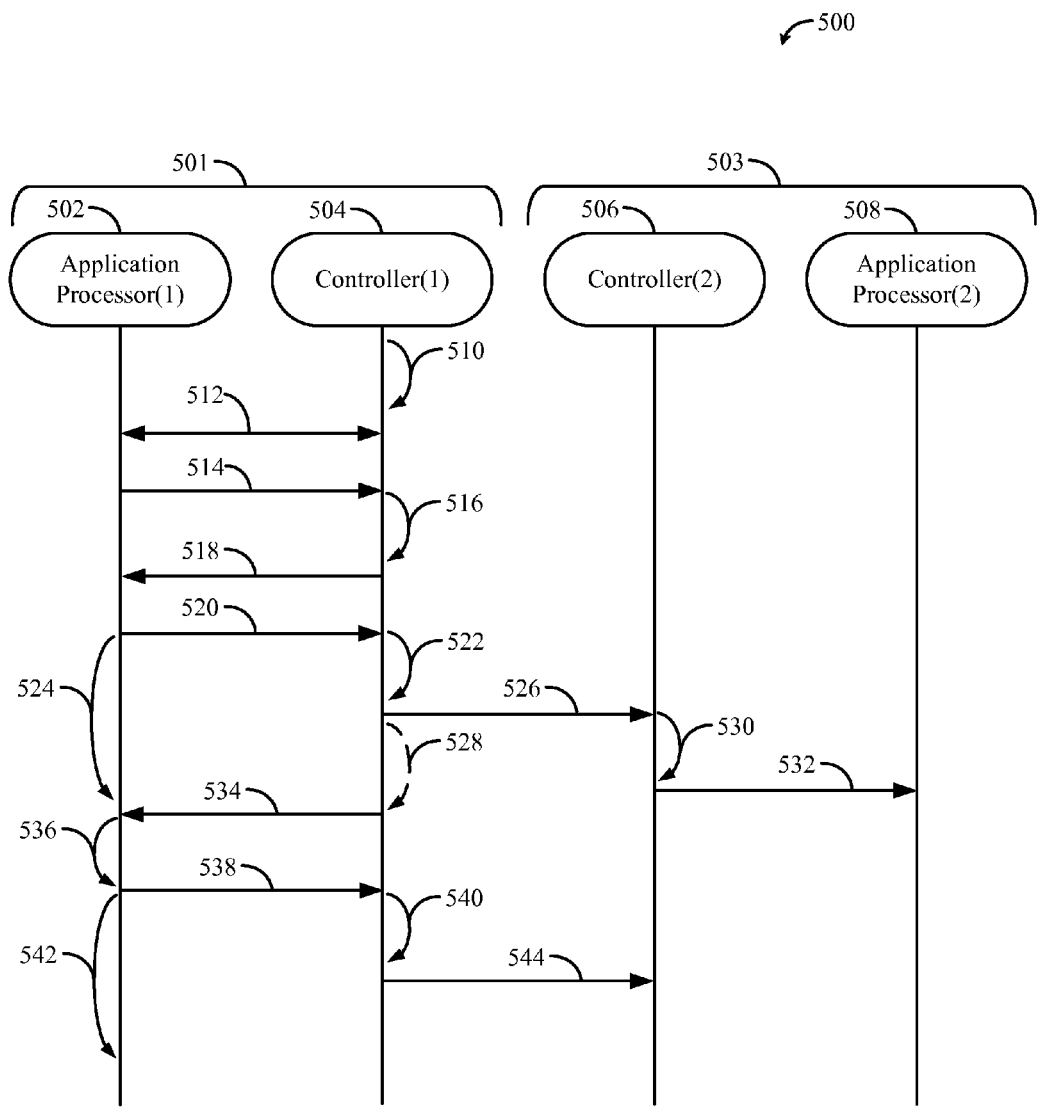
FIG. 5 is a call flow chart diagram illustrating a system for improving wireless communications through efficient memory management, according to an aspect.

FIG. 5 depicts an example call flow diagram describing a process for improving communications between multi-mode devices within an access network 500. Access network 500 may include a first wireless device 501 and a second wireless device 503 each of which may include an application processor (502, 508) and a controller (504, 506). Access network 500 may be operable to allow communication using a variety of communication protocols.

At act 510, a controller 504 associated with a first device 501 may determine an amount of memory available from each of the SOCs. In an aspect, the controller 504 may logically combine the available memory from the SOCs and determine a total memory available in the controller. In another aspect, the controller 504 may reserve a portion of the total memory available for conventional operation on any of the SOCs to continue as per classical specifications. In an aspect in which the controller 504 determines that there is insufficient memory and/or a processing delay may be too great, then the memories may be logically returned to their respective SOCs for use in conventional operations.

In an aspect, at act 512, controller 504 and application processor 502 may communicate an indication to the application processor 502 of the total memory available. According to another aspect, the controller 504 may provide the indication as part of a set up process. In another aspect, the application processor 502 may request the total memory available provide prior to commencement of communication of data larger than a threshold value. In another aspect, the application processor 502 may use information as to the total memory available to plan for when a sleep mode may be initiated.

At act 514, the application processor may communicate a first amount (e.g., chunk) of data. In an aspect, the size of the first amount of data may be associated with the total memory available. In another aspect, the size of the first amount of data may be based on a data packet size.

At act 516, the controller 504 may use at least a portion of the total memory available to buffer the first amount of data received from the application processor 502. In an aspect, the controller 504 may send internal "num complete" messages to prompt the application processor 502 to continue to communicate the amount of data. This may be repeated until the controller 504 has buffered a sufficient amount of data (e.g., based on the available logically combined memory buffers). In an aspect, there may be an initial delay in transmission to the second device 503 as the first amount of data is buffered.

At act 518, after the buffer has sufficiently filled, then the controller 504 may send a "continue" message to application processor 502. The continue message may indicate to the application processor 502 that the first amount of data (received and buffered earlier) has been sent by the controller 504 to the remote wireless controller 506, "continue" message, would indicate that the controller 504 is ready to receive further amounts (e.g., chunks) of data packets.

At act 520, the application processor 502 may transmit a second amount of data (e.g., second chunk) to the controller 504, and at act 522 the second amount of data may be buffered in the portion of the total memory available.

At act 524, the application processor 502 may cease communication of data to the controller. In an aspect, the application processor 502 may switch to a sleep mode. In another aspect, the application processor 502 may make resources available for other activities within the wireless device 501.

Concurrently and/or shortly after acts 520, 522 and/or 524, at act 526, the controller 504 may facilitate communication of the first amount of data to the second wireless device 503. In an aspect, the controller 504 may use multiple RATs available in wireless device 501 to communicate the first amount of data to the second wireless device 503. In an aspect, controller 504 may transmit a first portion of the first amount of data using a first RAT (e.g., Bluetooth) and a second portion of the first amount data using a second RAT (e.g., WiFi, RF technology, NFC, etc.). For example, a Bluetooth link may be used for audio streaming while a lower priority concurrent file transfer may be performed using one or more other RATs (e.g., WiFi, FM Radio, BLE, NFC, etc.). In an aspect, a watermark may be included in each amount of data (e.g., chunk) to control the availability of the next chunk(s) of data packets from the Application processor 502. In other words, when the watermark location is reached, the controller 504 may still have sufficient data in its internal buffers available to allow time for the previous empty buffers to be filled. This allows for improved flow of data while also improving time management.

The watermark may be used to prompt the controller 504 to obtain another amount of data (e.g., a third amount of data) from the application processor 502. In an aspect, at act 528, the watermark location in the first amount of data is reached during the transmission process. At act 534, the controller 504 may request that the application processor 502 to communicate a next amount of data (e.g., a next chunk).

The application processor 502 may wake up at act 536, the next amount of data may be communicated to the controller 504 at act 538, the controller 504 may buffer the next amount of data at act 540, and the application processor may cease communication (e.g., return to sleep) at act 542.

Returning to the transmission of the first amount of data, at act 530, the controller 506 of the second wireless device 503 may receive and buffer the amount of data prior to communicating the amount of data to the application processor 508 associated with the second wireless device at act 532. In an aspect in which multiple RATs have been used to communicate the data, controller 506 may recombine the portions prior to communicating the data to the application processor 508.

Similarly to act 526, at act 540, the controller 504 may transmit the second amount of data to the second wireless device 503.

The communications may continue as described above until the first wireless device 501 has completed transmission of data to the second wireless device 503.

As such a process is described in that provides improved interactions between various components within a wireless device (e.g., to reduce the host to controller interactions as much as possible) and improved communications between wireless devices.

Figure 6:
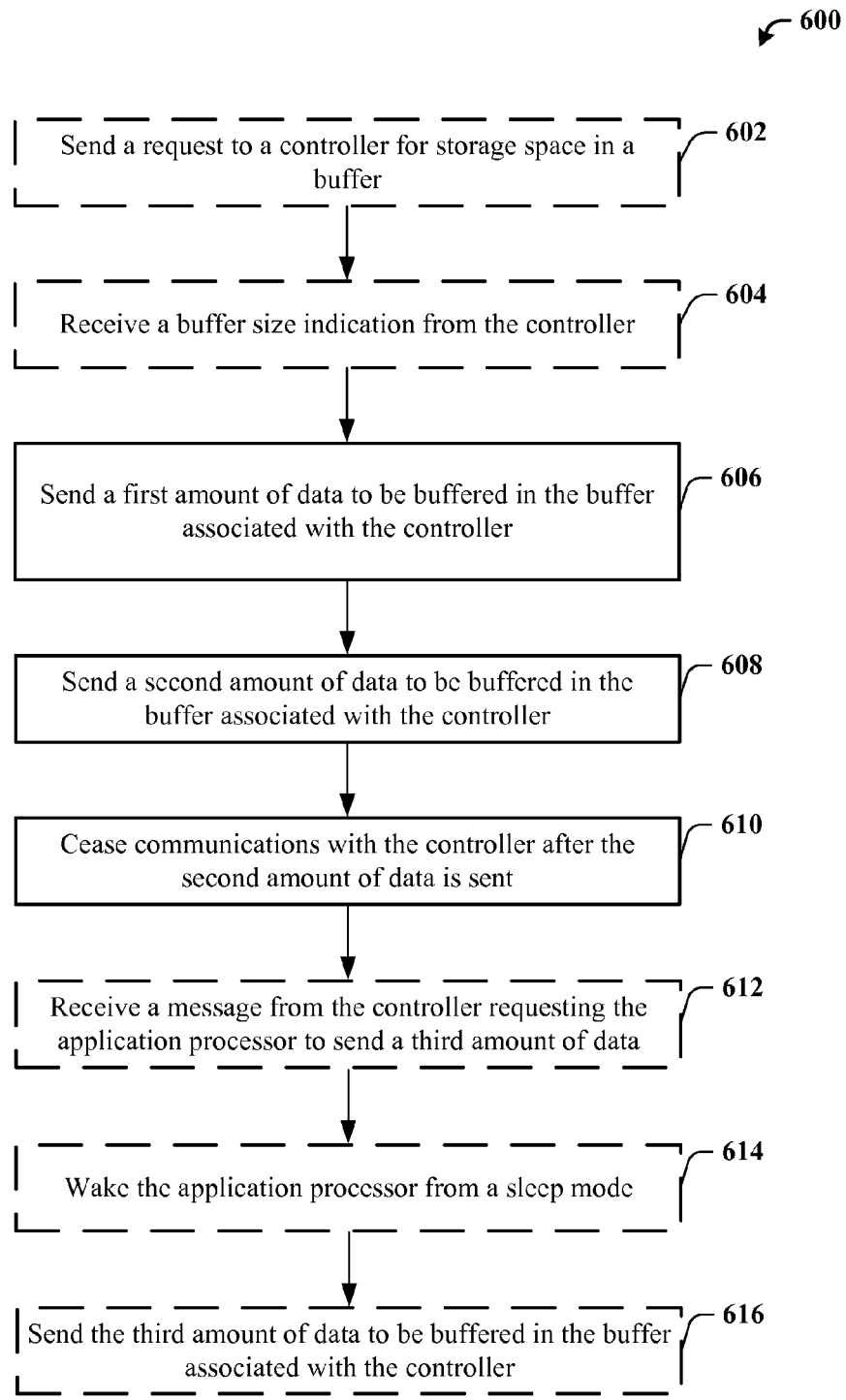
FIG. 6 is a flow chart illustrating an example method for improving wireless communications through efficient memory management, according to an aspect.

FIG. 6 depicts an example flowchart describing a first process 600 for improving wireless communications through efficient memory management. In an aspect, the process 600 may be performed by an application processor module (e.g., 404, 502) associated with a wireless device (e.g., wireless device 402, 501).

In an optional aspect, at block 602, an application processor (e.g., application processing module 404), may send a request to a controller (e.g., composite memory management module 414) for storage space in a buffer. In an aspect, the request may be sent by application module 904 to composite memory module 906 to determine storage space in logically combined buffer 909. The storage space in the buffer may be based on a number of SOCs active in the wireless device.

In a further optional aspect, at block 604, the application processor may receive a buffer size indication from the controller. In an aspect, the buffer size indication may be received in response to the request in optional block 602. In another aspect, the buffer size indication may be received periodically, when there is a change in the buffer size, etc. In an aspect, the buffer size indication may be received by application module 904. In such an aspect, the storage space in the buffer may be greater than a storage size available from dedicated memory on a SOC for any one access technology of a plurality of access technologies. Further, the plurality of access technologies may include a Bluetooth based access technology, a FM Radio based access technology, a WiFi based access technology, an ANT based access technology, a Zigbee based access technology, a NFC based access technology, etc.

At block 606, the application processor may send a first amount of data to the controller to be buffered in the buffer. In an aspect, the first amount of data may be larger than a threshold size (e.g., 500 MB). In an aspect, the first amount of data 912 may be sent by application module 904 to composite memory management module 906 for storage in logically combined buffer 909. In an aspect, the first amount of data may include a watermark tag 905 that is placed at a position in the first amount of data 912 to indicate when the controller is to prompt the application processor 904 for another amount of data 912.

At block 608, the application processor may send a second amount of data to the controller to be buffered. In an aspect, the second amount of data 912 may be sent by application module 904 to composite memory management module 906 for storage in logically combined buffer 909. In an aspect in which the first amount of data includes a watermark tag 905, the application processor may send the second amount of data once it receives an indication from the controller that the watermark tag 905 position in the first amount of data has been reached.

At block 610, the application processor may cease communications with the controller after the second amount of data is sent. In an aspect, the application module 904 may cease communications with the composite memory management module 906. In an aspect, the ceasing of communication may further include making resources associated with the application processor available for other processing tasks. In another aspect, the ceasing of communications may further include the application processor entering a sleep mode. For example, a packet includes 1021 bytes, and 5 Bluetooth slots may be needed to fully transmit the 1021 bytes. As such, a total transmit time for the 1021 bytes may be equal to 5 Bluetooth slots times 0.625 uSecs per slot equals 3.125 ms to transmit the packet. In such an aspect, application processor may send multiple packets (e.g., 640 packets) to be buffered. The time used to communicate the multiple packets (e.g., 640 packets) may be a sufficiently long duration (e.g., 2 seconds) to allow the application processor to end a sleep mode. Further, the wake up-send data-reenter sleep mode cycle for the application processor may take a comparatively short duration (e.g., 6.25 ms). Accordingly, in such an example aspect, the ceasing of communications may include entering a sleep mode for a duration (e.g., greater than a second), and potentially waking for a short duration (e.g., 6.25 ms) to communicate another chunk of data (e.g., 640 packets). Further, such a system allows for uninterrupted communication of the packets by the controller.

In an optional aspect in which the ceasing of communications includes the application processor ending a sleep mode, the application processor may receive a message from the controller requesting the application processor to send a third amount of data at block 612, wake the application processor from the sleep mode at block 614, and send the third amount of data to be buffered in the buffer associated with the controller at block 616. Thereafter, the application processor may return to the sleep mode. In an aspect, the reception of the request, waking up, and the sending of third amount of data 912 to the composite memory management module 906 may be performed by the application module 904.

Figure 7:
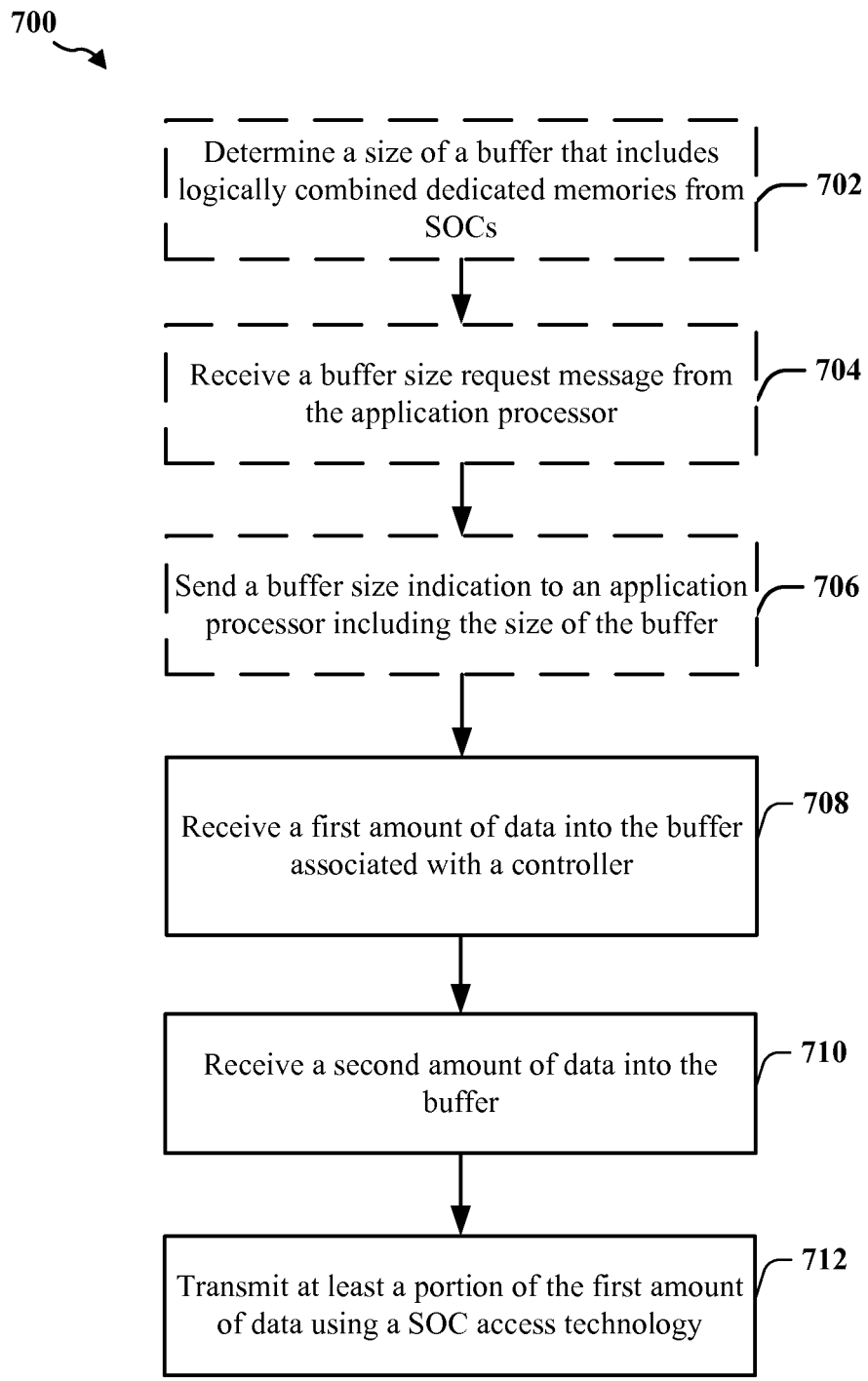
FIG. 7 is a flow chart illustrating another example method for improving wireless communications through efficient memory management, according to an aspect.

FIG. 7 depicts an example flowchart describing a second process 700 for improving wireless communications through efficient memory management. In an aspect, the process 700 may be performed by a controller (e.g., 414, 504) associated with a wireless device (e.g., wireless device 402, 501).

In an optional aspect, at block 702, a controller may determine a size of a buffer by logically combining the dedicated memories from the SOCs for the plurality of access technologies controlled by the controller. In an aspect, the determination may be performed by composite memory management module 906 and may be based on logically combined buffer 909. In an aspect, the storage space in the buffer may be greater than a storage size available from dedicated memory on a SOC for any one access technology of a plurality of access technologies. Further, the plurality of access technologies may include a Bluetooth based access technology, a FM Radio based access technology, a WiFi based access technology, an ANT based access technology, a Zigbee based access technology, a NFC based access technology, etc.

Further, in the optional aspect, the controller may receive a buffer size request message from an application processor at block 704, and may send a buffer size indication to the application processor at block 706. In another optional aspect, at block 706, the controller may send a buffer size indication to the application processor periodically, when a change in buffer size is determined, etc. In an aspect, the reception of the request and/or the sending of the buffer size indication may be performed by composite memory management module 906.

At block 708, the controller may receive a first amount of data into the buffer. In an aspect, the reception of the data 912 into the buffer 909 may be performed by composite memory management module 906. In an aspect, the data 912 may be distributed into the dedicated memories associated with two or more of the SOCs controlled by the controller. In an aspect, first amount of data 912 may include a watermark tag 905 at a position in the first amount of data 912 which prompts the controller to request another amount of data 912. In another aspect, the reception of the data 912 may include sending internal continue messages to the application processor after receipt of each portion of the first amount of data 912.

At block 710, the controller may receive a second amount of data for buffer. In an aspect, the reception of the data 912 into the buffer 909 may be performed by composite memory management module 906. In an aspect, the controller may receive data from an application processor at a rate that is greater than a rate of transmission of the data by the wireless device.

At block 712, the controller may transmit at least a portion of the first amount of dating using at least one of the access technologies. In an aspect, the data 912 transmission may be performed by transmission module 908. In an aspect in which the data 912 includes a watermark tag 905, the transmission of the data 912 up to the watermark tag 905 location may prompt the controller to request another (e.g., third) amount of data 912 from the application processor. In another aspect, the controller may transmit the data 912 using multiple access technologies. In such an aspect, a first portion (e.g., latency sensitive portion) of data 912 may be transmitted using a first access technology (e.g., Bluetooth), while a second portion (e.g., control data) may be transmitted using one or more other access technologies (e.g., WiFi, FM, etc.). As used herein, a latency sensitive portion of data may refer to audio and/or video, etc., or any other traffic in which time of arrival is a priority. Further the latency sensitive portion may be sent over and/or received from a remote wireless device. As used herein, a control data portion may include, but is not limited to, lower priority data traffic. For example, the lower priority data traffic may include a small picture, a file being transferred to/from a remote wireless device, etc.

Figure 8:
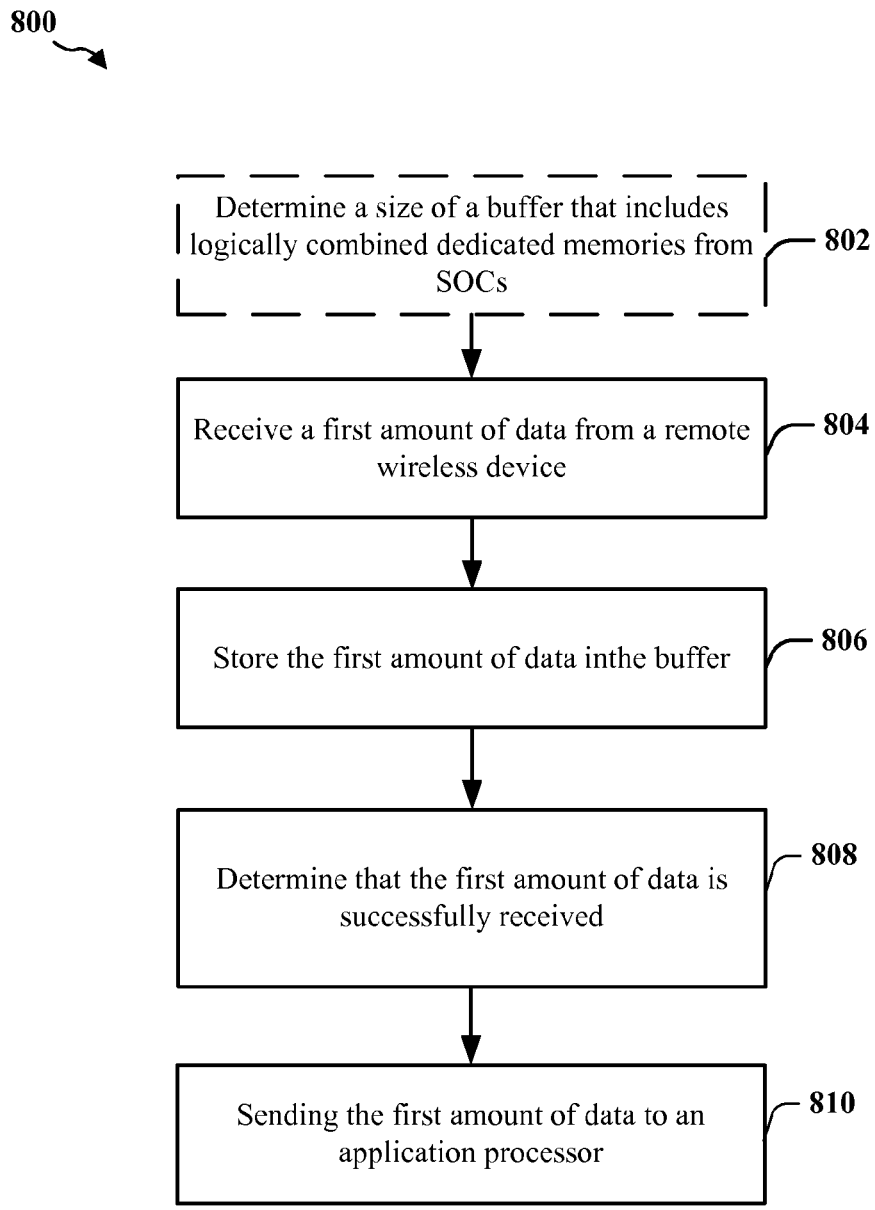
FIG. 8 is a flow chart illustrating still another example method for improving wireless communications through efficient memory management, according to an aspect.

FIG. 8 depicts an example flowchart describing a third process 800 for improving wireless communications through efficient memory management. In an aspect, the process 800 may be performed by a controller (e.g., 414, 506) associated with a wireless device (e.g., wireless device 402, 503).

In an optional aspect, at block 802, a controller may determine a size of a buffer by logically combining the dedicated memories from the SOCs for the plurality of access technologies controlled by the controller. In an aspect, the determination may be performed by composite memory management module 906 and may be based on logically combined buffer 909. In an aspect, the storage space in the buffer may be greater than a storage size available from dedicated memory on a SOC for any one access technology of a plurality of access technologies. Further, the plurality of access technologies may include a Bluetooth based access technology, a FM Radio based access technology, a WiFi based access technology, an ANT based access technology, a Zigbee based access technology, a NFC based access technology, etc.

At block 804, the controller may receive a first amount of data from a remote wireless device 430. In an aspect, the reception of the first amount of data 914 may be performed by reception module 910. In an aspect, the first amount of data 914 may be received in portions, where a first sub-portion of the first amount of data is received using a first access technology and a second sub-portion of the first amount of data is received using a second access. In such an aspect, the first sub-portion may include a latency sensitive portion of the first amount of data, and the second sub-portion may include a control data portion of the first amount of data.

At block 806, the controller may store the first amount of data in a buffer. In an aspect, the storage of the first amount of data 914 in a buffer 909 may be performed by composite memory management module 906. In an aspect, the buffer may include logically combined dedicated memories from SOCs for a plurality of access technologies controlled by the controller.

At block 808, the controller may determine whether the first amount of data is successfully received. In an aspect, the determination may be performed by composite memory management module 906. In an aspect in which the data 914 is received using multiple access technologies, the determination may further include combining the first and second sub-portions of the first amount of data.

At block 810, the controller may send the first amount of data to an application processor. In an aspect, the controller may be the composite memory management module 906, the application processor may be the application module 904, and the first amount of data may be data 914.

Figure 9:
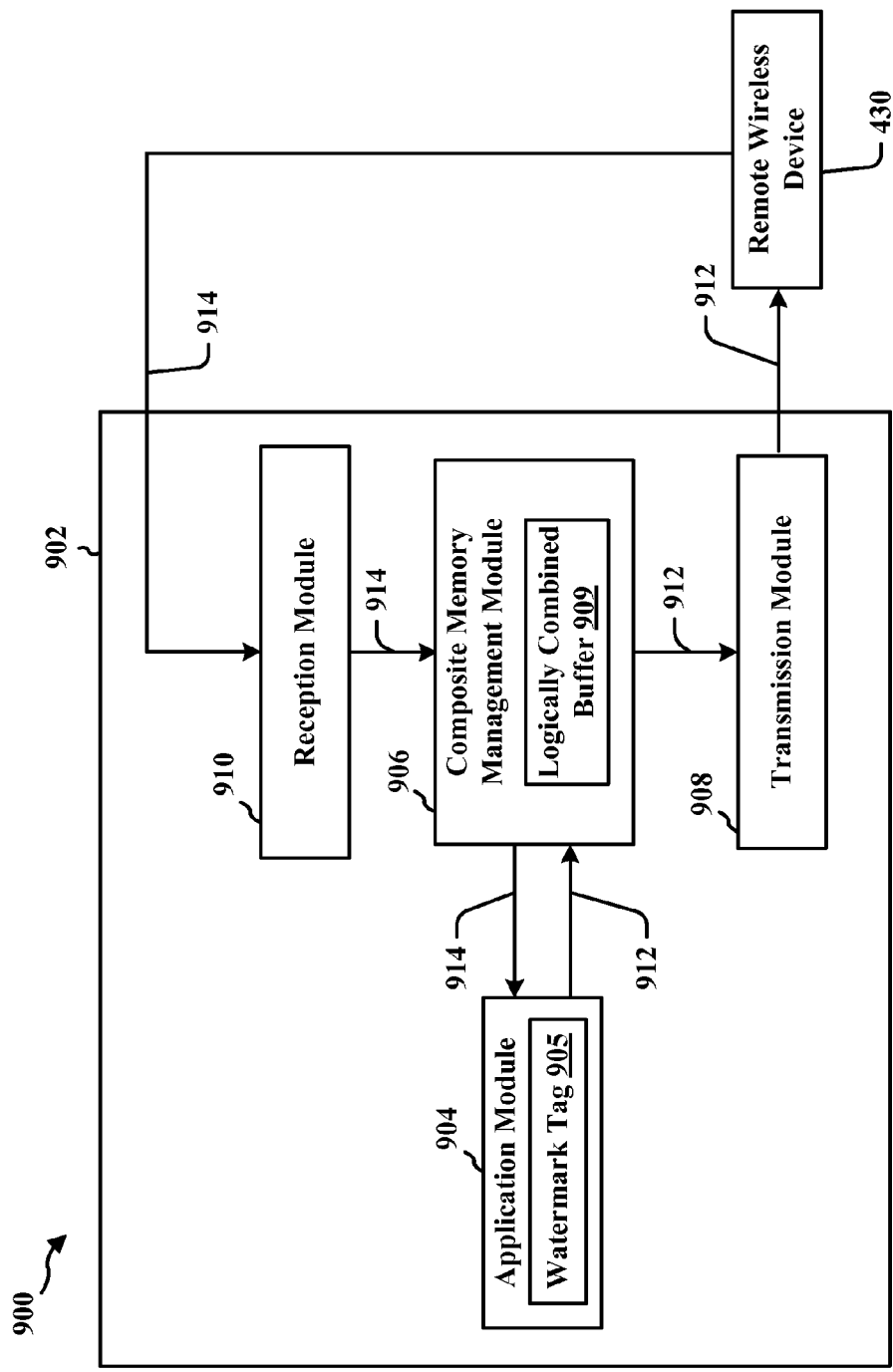
FIG. 9 is a conceptual data flow diagram illustrating the data flow between different modules/means/components in an exemplary apparatus.

FIG. 9 is a conceptual data flow diagram 900 illustrating the data flow between different modules/means/components in an exemplary apparatus 902. The apparatus may be a wireless device, UE, WCD, etc. As described with respect to FIGS. 6, 7, and 8, the apparatus includes an application module 904 with a watermark tag 905 functionality, a composite memory management module 906 with a logically combined buffer 909, a transmission module 908, and a reception module 910.

Figure 10:
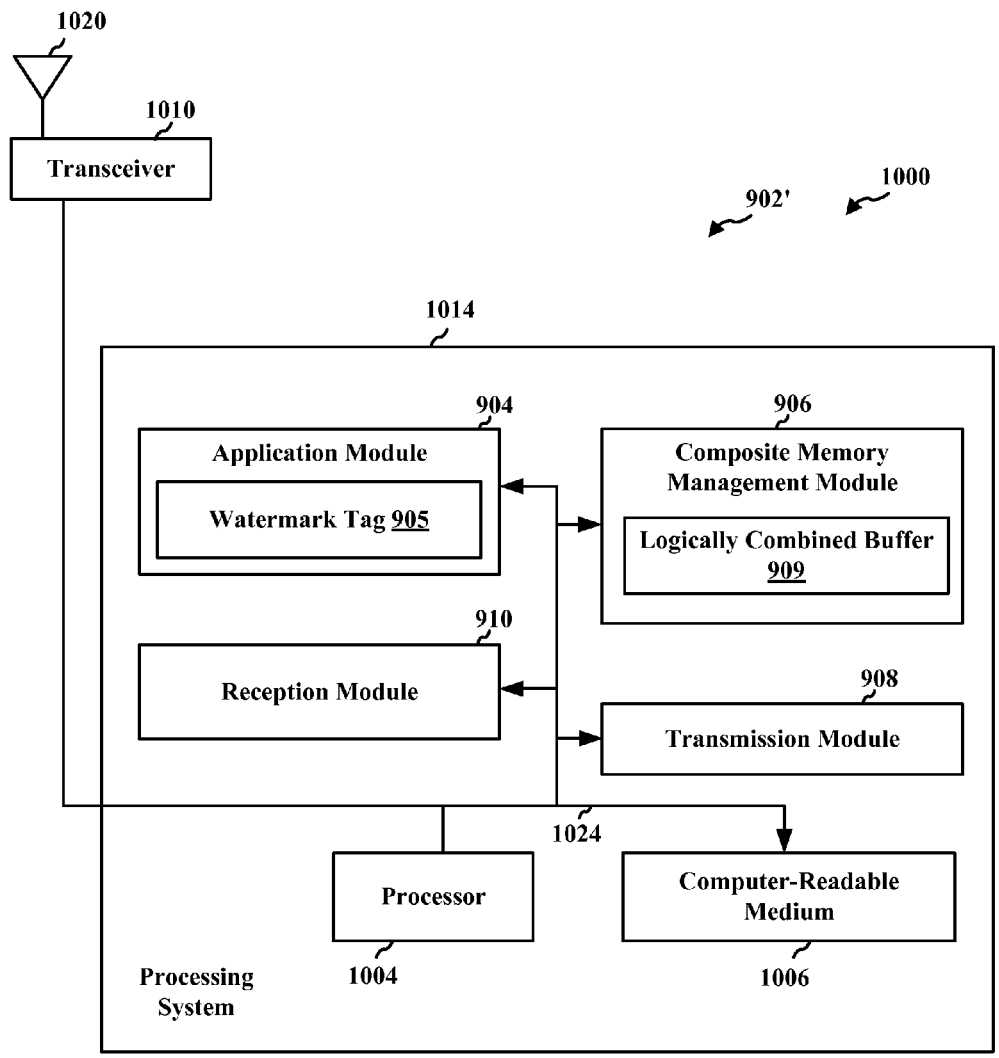
FIG. 10 is a diagram illustrating an example of a hardware implementation for an apparatus employing a processing system.

The apparatus may include additional modules that perform each of the steps of the algorithm in the aforementioned call flows and/or flow chart of FIGS. 5, 6, 7, and 8. As such, each act/block in the aforementioned FIGS. 5, 6, 7, and 8 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof FIG. 10 is a diagram 1000 illustrating an example of a hardware implementation for an apparatus 902' employing a processing system 1014. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware modules, represented by the processor 1004, the modules 904, 905, 906, 908, 909, 910, and the computer-readable medium 1006. The bus 1024 may also link various other circuits such as timing sources, peripherals, voltage regulators, and power management circuits, which are well known in the art, and therefore, will not be described any further.

The processing system 1014 may be coupled to a transceiver 1010. The transceiver 1010 is coupled to one or more antennas 1020. The transceiver 1010 provides a means for communicating with various other apparatus over a transmission medium. The processing system 1014 includes a processor 1004 coupled to a computer-readable medium 1006. The processor 1004 is responsible for general processing, including the execution of software stored on the computer-readable medium 1006. The software, when executed by the processor 904, causes the processing system 1014 to perform the various functions described supra for any particular apparatus. The computer-readable medium 1006 may also be used for storing data that is manipulated by the processor 1004 when executing software. The processing system further includes at least one of the modules 904, 905, 906, 908, 909, and 910. The modules may be software modules running in the processor 1004, resident/stored in the computer-readable medium 1006, one or more hardware modules coupled to the processor 1004, or some combination thereof. In an aspect, the processing system 1014 may be a component of the UE 350 and may include the memory 360 and/or at least one of the TX processor 368, the RX processor 356, and the controller/processor 359.

In one configuration, the apparatus 902/902' for wireless communication includes means for sending that is configured to send a first amount of data to be buffered in a buffer associated with a controller, and to send a second amount of data to be buffered in the buffer associated with the controller, and means for ceasing communications with the controller after the second amount of data is sent. In an aspect, the first amount of data may be larger than a threshold data size. In another aspect, the buffer may include logically combined dedicated memories from SOCs for a plurality of access technologies controlled by the controller. In an aspect, apparatus 902/902' may also include means for receiving from the controller a buffer size indication which indicates an amount of storage space in the buffer. In an aspect the storage space in the buffer may be greater than a storage size available from dedicated memory on a SOC for any one access technology of the plurality of access technologies. In an aspect, the apparatus 902/902' means for receiving may be further configured to receive an indication that a watermark tag position in the first amount of data has been reached. In an aspect, the apparatus 902/902' means for sending may be further configured to send a request to the controller for the storage space in the buffer. In an aspect, the apparatus 902/902' means for ceasing may be further configured to switch to a sleep mode. In such an aspect, apparatus 902/902' may be further include means for receiving a message from the controller requesting the application processor to send a third amount of data, means for waking the application processor from the sleep mode, and means for sending the third amount of data to be buffered in the buffer associated with the controller. In an aspect, the apparatus 902/902' means for ceasing may be further configured to make resources associated with the application processor available for one or more other processing tasks.

In another configuration, the apparatus 902/902' for wireless communication includes means for receiving that are configured to receive a first amount of data into a buffer associated with a controller, and receive a second amount of data into the buffer, and means for transmitting at least a portion of the first amount of data using at least one of the plurality of access technologies. In an aspect, receive the buffer may include logically combined dedicated memories from SOCs for a plurality of access technologies controlled by the controller. In an aspect, apparatus 902/902' means for receiving may be further configured to distribute the data into the dedicated memories associated with two or more of the SOCs controlled by the controller. In an aspect, apparatus 902/902' may also include means for determining a size of the buffer by logically combining the dedicated memories from the SOCs for the plurality of access technologies controlled by the controller. In such an aspect, the apparatus 902/902' may also include means for sending a buffer size indication to an application processor including the size of the buffer. Further, in such an aspect, the apparatus 902/902' means for receiving may be configured to receive a buffer size request message from the application processor. In an aspect, the buffer size indication may be sent in response to receipt of the buffer size request message. In an aspect in which the first amount of data includes a watermark tag, the apparatus 902/902' means for transmitting may be configured to transmit at least until the watermark tag position. In such an aspect, the apparatus 902/902' means for sending may be configured to send a request to receive a third amount of data, and the apparatus 902/902' means for receiving may be further configured to receive the third amount of data into the buffer. In another aspect, the apparatus 902/902' means for transmitting may be configured to transmit a first sub-portion of the first amount of data using a first access technology, and transmit a second sub-portion of the first amount of data using a second access technology. In such an aspect, the first sub-portion may include a latency sensitive portion of the first amount of data and the second sub-portion may include a control data portion of the first amount of data. In such an aspect, the apparatus 902/902' means for sending may be configured to send internal continue messages after receipt of each portion of the first amount of data.

In still another configuration, the apparatus 902/902' for wireless communication includes means for receiving, by a controller, a first amount of data from a remote wireless device, means for storing the first amount of data in a buffer, means for determining that the first amount of data is successfully received, and means for sending the first amount of data to an application processor based on the determination. In an aspect, the buffer may include logically combined dedicated memories from SOCs for a plurality of access technologies controlled by the controller. In an aspect, apparatus 902/902' may include means for determining a size of the buffer by logically combining the dedicated memories from the SOCs for the plurality of access technologies controlled by the controller. In an aspect, apparatus 802/802' means for receiving are further configured to receive a first sub-portion of the first amount of data using a first access technology of the plurality of access technologies, and to receive a second sub-portion of the first amount of data using a second access technology of the plurality of access technologies. In such an aspect, the first sub-portion may include a latency sensitive portion of the first amount of data and the second sub-portion may include a control data portion of the first amount of data.

As described supra, the processing system 1014 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication, comprising:
    sending, by an application processor, an amount of data to be buffered in a combined buffer associated with a controller, wherein the combined buffer includes at least a portion of two or more logically combined dedicated memories from a plurality of system on chips (SOCs) each to facilitate communication for one of a plurality of radio access technologies (RATs) controlled by the controller, each of the plurality of SOCs having a separate, dedicated memory with a respective storage size, a separate processor, and a separate Internet Protocol (IP) corresponding to the one of the plurality of RATs, wherein the amount of data is for transmission according to a RAT of one of the plurality of SOCs, and wherein the amount of data is greater than the storage size of the separate, dedicated memory of the one of the plurality of SOCs; and ceasing communications with the controller after the amount of data is sent until the controller transmits a first portion of the amount of data using a first RAT of the plurality of RATs, wherein the first portion includes a latency sensitive portion of the amount of data, and a second portion of the amount of data using a second RAT of the plurality of RATs, wherein the first RAT and second RAT are different, and wherein the second portion includes a control data portion of the amount of data.

2. The method of claim 1, further comprising:
receiving from the controller a buffer size indication which indicates an amount of storage space in the combined buffer, wherein the storage space in the combined buffer is greater than the respective storage size available from any dedicated memory on any SOC for any one RAT of the plurality of RATs.

3. The method of claim 2, further comprising sending a request to the controller for the storage space in the combined buffer.

4. The method of claim 2, wherein the plurality of RATs comprise at least two of: a Bluetooth based access technology, a FM Radio based access technology, a WiFi based access technology, an ANT based access technology, a Zigbee based access technology, or a NFC based access technology.

5. The method of claim 1, wherein the ceasing communications further comprises switching to a sleep mode.

6. The method of claim 5, further comprising:
receiving a message from the controller requesting the application processor to send an additional amount of data;
waking the application processor from the sleep mode; and
sending the additional amount of data to be buffered in the combined buffer.

7. The method of claim 1, wherein the ceasing communications further comprises making resources associated with the application processor available for one or more other processing tasks.

8. The method of claim 1, wherein the amount of data includes a watermark tag that is placed at a position in the amount of data to indicate when the controller is to prompt the application processor for an additional amount of data.

9. The method of claim 8, further comprising:
receiving an indication that the watermark tag position in the amount of data has been reached; and
sending the additional amount of data.

10. A method of wireless communication, comprising:
receiving an amount of data into a combined buffer associated with a controller, wherein the combined buffer includes at least a portion of two or more logically combined dedicated memories from a plurality of system on chips (SOCs) each to facilitate communication for one of a plurality of radio access technologies (RATs) controlled by the controller, each of the plurality of SOCs having a separate, dedicated memory with a respective storage size, a separate processor, and a separate Internet Protocol (IP) corresponding to the one of the plurality of RATs, wherein the amount of data is for transmission according to a RAT of one of the plurality of SOCs, and wherein the amount of data is greater than the storage size of the separate, dedicated memory of the one of the plurality of SOCs;

transmitting a first portion of the amount of data using a first RAT of the plurality of RATs, wherein the first portion includes a latency sensitive portion of the amount of data; and transmitting a second portion of the amount of data using a second RAT of the plurality of RATs, wherein the first RAT and second RAT are different, and wherein the second portion includes a control data portion of the amount of data.

11. The method of claim 10, wherein the receiving further comprises distributing the amount of data into different ones of the separate, dedicated memories associated with the plurality of SOCs controlled by the controller.

12. The method of claim 10, further comprising:
determining a size of the combined buffer; and
sending a buffer size indication to an application processor including the size of the combined buffer.

13. The method of claim 12, further comprising:
receiving a buffer size request message from the application processor, wherein the buffer size indication is sent in response to receipt of the buffer size request message.

14. The method of claim 10, further comprising:
wherein the amount of data includes a watermark tag at a position in the amount of data to indicate when the controller is to request an additional amount of data, wherein the transmitting comprises transmitting at least until the watermark tag position;
sending a request to receive the additional amount of data when the transmitting of the first portion or the second portion of the amount of data reaches the position of the watermark tag; and
receiving the additional amount of data into the buffer.

15. The method of claim 10, wherein the plurality of RATs comprise at least two of: a Bluetooth based access technology, a FM Radio based access technology, a WiFi based access technology, an ANT based access technology; a Zigbee based access technology, or a NFC based access technology.

16. The method of claim 10, wherein a rate at which the amount of data is received into the combined buffer is faster than a rate of transmission used to transmit the first portion and the second portion of the amount of data.

17. The method of claim 10, further comprising sending internal continue messages after receipt of each portion of the amount of data, wherein the internal continue messages indicate to an application processor that further amounts of data are ready to be received.

18. A method of wireless communication, comprising:
receiving, by a controller, an amount of data from a remote wireless device;
storing the amount of data in a combined buffer, wherein the combined buffer includes at least a portion of two or more logically combined dedicated memories from a plurality of system on chips (SOCs) that each facilitate communication for one of a plurality of radio access technologies (RATs) controlled by the controller, each of the plurality of SOCs having a separate, dedicated memory with a respective storage size, a separate processor, and a separate Internet Protocol (IP) corresponding to the one of the plurality of RATs, and wherein the amount of data is greater than the storage size of the separate, dedicated memory of any of the plurality of SOCs;
determining that the amount of data is successfully received; and
sending the amount of data to an application processor based on the determination;
wherein a first portion of the amount of data is received using a first RAT of the plurality of RATs and includes a latency sensitive portion of the amount of data, wherein a second portion of the amount of data is received using a second RAT of the plurality of RATs and includes a control data portion of the amount of data, and wherein the first RAT and second RAT are different.

19. The method of claim 18, further comprising:
maintaining a reserved portion in at least one dedicated memory of at least one of the plurality of SOCs, wherein each reserved portion is sized for conventional operation of the respective one of the plurality of SOCs; and
logically combining an available portion of the two or more of the dedicated memories from the plurality of SOCs, wherein each available portion is different from each reserved portion in each dedicated memory of each of the plurality of SOCs.

20. The method of claim 18, wherein the plurality of RATs comprise at least two of: a Bluetooth based access technology, a FM Radio based access technology, a WiFi based access technology, an ANT based access technology, a Zigbee based access technology, or a NFC based access technology.

21. The method of claim 18, wherein the determining further comprises combining the first portion and the second portion of the amount of data.

22. An apparatus for wireless communication, comprising:
means for sending an amount of data to be buffered in a combined buffer associated with a controller, wherein the combined buffer includes at least a portion of two or more logically combined dedicated memories from a plurality of system of on chips (SOCs) each to facilitate communication for one of a plurality of radio access technologies (RATs) controlled by the controller, each of the plurality of SOCs having a separate, dedicated memory with a respective storage size, a separate processor, and a separate Internet Protocol (IP) corresponding to the one of the plurality of RATs, wherein the amount of data is for transmission according to a RAT of one of the plurality of SOCs, and wherein the amount of data is greater than the storage size of the separate, dedicated memory of the one of the plurality of SOCs; and
means for ceasing communications with the controller after the amount of data is sent until the controller transmits a first portion of the amount of data using a first RAT of the plurality of RATs, wherein the first portion includes a latency sensitive portion of the amount of data, and a second portion of the amount of data using a second RAT of the plurality of RATs, wherein the first RAT and second RAT are different, and wherein the second portion includes a control data portion of the amount of data.

23. An apparatus for wireless communication, comprising:
means for receiving an amount of data into a buffer associated with a controller, wherein the buffer includes at least a portion of two or more logically combined dedicated memories from a plurality of system on chips (SOCs) each to facilitate communication for one of a plurality of radio access technologies (RATs) controlled by the controller, each of the plurality of SOCs having a separate, dedicated memory with a respective storage size, a separate processor, and a separate Internet Protocol (IP) corresponding to the one of the plurality of RATs, wherein the amount of data is for transmission according to a RAT of one of the plurality of SOCs, and wherein the amount of data is greater than the storage size of the separate, dedicated memory of the one of the plurality of SOCs;
means for transmitting a first portion of the amount of data using a first RAT of the plurality of RATs, wherein the first portion includes a latency sensitive portion of the amount of data; and
means for transmitting a second portion of the amount of data using a second RAT of the plurality of RATs, wherein the first RAT and second RAT are different, and wherein the second portion includes a control data portion of the amount of data.

24. An apparatus for wireless communication, comprising:
means for receiving, by a controller, an amount of data from a remote wireless device;
means for storing the amount of data in a combined buffer, wherein the combined buffer includes at least a portion of two or more logically combined dedicated memories from a plurality of system on chips (SOCs) that each facilitate communication for one of a plurality of radio access technologies (RATs) controlled by the controller, each of the plurality of SOCs having a separate, dedicated memory with a respective storage size, a separate processor, and a separate Internet Protocol (IP) corresponding to the one of the plurality of RATs, and wherein the amount of data is greater than the storage size of the separate, dedicated memory of any of the plurality of SOCs;
means for determining that the amount of data is successfully received; and
means for sending the amount of data to an application processor based on the determination;
wherein a first portion of the amount of data is received using a first RAT of the plurality of RATs and includes a latency sensitive portion of the amount of data, wherein a second portion of the amount of data is received using a second RAT of the plurality of RATs and includes a control data portion of the amount of data, and wherein the first RAT and second RAT are different.

25. An apparatus for wireless communication, comprising:
an application processor configured to:
send an amount of data to be buffered in a combined buffer associated with a controller, wherein the combined buffer includes at least a portion of two or more logically combined dedicated memories from a plurality of system on chips (SOCs) each to facilitate communication for one of a plurality of radio access technologies (RATs) controlled by the controller, each of the plurality of SOCs having a separate, dedicated memory with a respective storage size, a separate processor, and a separate Internet Protocol (IP) corresponding to the one of the plurality of RATs, wherein the amount of data is for transmission according to a RAT of one of the plurality of SOCs, and wherein the amount of data is greater than the storage size of the separate, dedicated memory of the one of the plurality of SOCs; and
cease communications with the controller after the amount of data is sent until the controller transmits a first portion of the amount of data using a first RAT of the plurality of RATs, wherein the first portion includes a latency sensitive portion of the amount of data, and a second portion of the amount of data using a second RAT of the plurality of RATs, wherein the first RAT and second RAT are different, and wherein the second portion includes a control data portion of the amount of data.

26. An apparatus for wireless communication, comprising:
a plurality of system of chips (SOCs) each to facilitate communication for one of a plurality of radio access technologies (RATs) controlled by a controller, each of the plurality of SOCs having a separate, dedicated memory with a respective storage size, a separate processor, and a separate Internet Protocol (IP) corresponding to the one of the plurality of RATs;
a buffer associated with the controller and configured to receive an amount of data, wherein the buffer includes at least a portion of two or more logically combined dedicated memories from the plurality of system on chips (SOCs), wherein the amount of data is for transmission according to a RAT of one of the plurality of SOCs, and wherein the amount of data is greater than the storage size of the separate, dedicated memory of the one of the plurality of SOCs;
a modem module having a first radio and a second radio;
wherein the first radio is configured to transmit a first portion of the amount of data using a first RAT of the plurality of RATs, wherein the first portion includes a latency sensitive portion of the amount of data; and
wherein the second radio is configured to transmit a second portion of the amount of data using a second RAT of the plurality of RATs, wherein the first RAT and second RAT are different, and wherein the second portion includes a control data portion of the amount of data.

27. An apparatus for wireless communication, comprising:
a controller configured to:
receive an amount of data from a remote wireless device;
store the amount of data in a combined buffer, wherein the combined buffer includes at least a portion of two or more logically combined dedicated memories from a plurality of system on chips (SOCs) that each facilitate communication for one of a plurality of radio access technologies (RATs) controlled by the controller, each of the plurality of SOCs having a separate, dedicated memory with a respective storage size, a separate processor, and a separate Internet Protocol (IP) corresponding to the one of the plurality of RATs, and wherein the amount of data is greater than the storage size of the separate, dedicated memory of any of the plurality of SOCs;
determine that the amount of data is successfully received; and
send the amount of data to an application processor based on the determination;
wherein a first portion of the amount of data is received using a first RAT of the plurality of RATs and includes a latency sensitive portion of the amount of data, wherein a second portion of the amount of data is received using a second RAT of the plurality of RATs and includes a control data portion of the amount of data, and wherein the first RAT and second RAT are different.

28. A non-transitory computer-readable medium storing computer-executable code for wireless communication, comprising:
code executable to send, by an application processor, an amount of data to be buffered in a combined buffer associated with a controller, wherein the combined buffer includes at least a portion of two or more logically combined dedicated memories from a plurality of system on chips (SOCs) each to facilitate communication for one of a plurality of radio access technologies (RATs) controlled by the controller, each of the plurality of SOCs having a separate, dedicated memory with a respective storage size, a separate processor, and a separate Internet Protocol (IP) corresponding to the one of the plurality of RATs, wherein the amount of data is for transmission according to a RAT of one of the plurality of SOCs, and wherein the amount of data is greater than the storage size of the separate, dedicated memory of the one of the plurality of SOC; and
code executable to cause the application processor to cease communications with the controller after the amount of data is sent until the controller transmits a first portion of the amount of data using a first RAT of the plurality of RATs, wherein the first portion includes a latency sensitive portion of the amount of data, and a second portion of the amount of data using a second RAT of the plurality of RATs, wherein the first RAT and second RAT are different, and wherein the second portion includes a control data portion of the amount of data.

29. A non-transitory computer-readable medium storing computer-executable code for wireless communication, comprising:
code executable to receive an amount of data into a buffer associated with a controller, wherein the buffer includes at least a portion of two or more logically combined dedicated memories from a plurality of system on chips (SOCs) each to facilitate communication for one of a plurality of radio access technologies (RATs) controlled by the controller, each of the plurality of SOCs having a separate, dedicated memory with a respective storage size, a separate processor, and a separate Internet Protocol (IP) corresponding to the one of the plurality of RATs, wherein the amount of data is for transmission according to a RAT of one of the plurality of SOCs, and wherein the amount of data is greater than the storage size of the separate, dedicated memory of the one of the plurality of SOCs;
code executable to transmit a first portion of the amount of data using a first RAT of the plurality of RATs, wherein the first portion includes a latency sensitive portion of the amount of data; and
code executable to transmit a second portion of the amount of data using a second RAT of the plurality of RATs, wherein the first RAT and second RAT are different, and wherein the second portion includes a control data portion of the amount of data.

30. A non-transitory computer-readable medium storing computer-executable code for wireless communication, comprising:
code executable to receive, by a controller, an amount of data from a remote wireless device;
code executable to store the amount of data in a combined buffer, wherein the combined buffer includes at least a portion of two or more logically combined dedicated memories from a plurality of system on chips (SOCs) that each facilitate communication for one of a plurality of radio access technologies (RATs) controlled by the controller, each of the plurality of SOCs having a separate, dedicated memory with a respective storage size, a separate processor, and a separate Internet Protocol (IP) corresponding to the one of the plurality of RATs, and wherein the amount of data is greater than the storage size of the separate, dedicated memory of any of the plurality of SOCs;

code executable to determine that the amount of data is successfully received; and code executable to send the amount of data to an application processor based on the determination;

wherein a first portion of the amount of data is received using a first RAT of the plurality of RATs and includes a latency sensitive portion of the amount of data, wherein a second portion of the amount of data is received using a second RAT of the plurality of RATs and includes a control data portion of the amount of data, and wherein the first RAT and second RAT are different.

31. The method of claim 1, wherein a rate at which the amount of data is transmitted to the combined buffer is faster than a rate of transmission used by the controller to transmit the first portion and the second portion of the amount of data.

32. The method of claim 18, wherein a rate at which the amount of data is received into the combined buffer is faster than a rate of transmission to transmit the first portion and the second portion of the amount of data.

* * * * *